(12) United States Patent
Dahl et al.

(10) Patent No.: US 11,835,010 B2
(45) Date of Patent: Dec. 5, 2023

(54) FOUR-STROKE INTERNAL COMBUSTION ENGINE AND METHOD OF OPERATING FOUR-STROKE INTERNAL COMBUSTION ENGINE

(71) Applicant: Scania CV AB, Södertälje (SE)

(72) Inventors: Andreas Dahl, Nyköping (SE); Michael Vallinder, Mölnbo (SE)

(73) Assignee: Scania CV AB, Södertälje (SE)

( * ) Notice: Subject to any disclaimer, the term of this patent is extended or adjusted under 35 U.S.C. 154(b) by 0 days.

(21) Appl. No.: 17/431,186

(22) PCT Filed: Feb. 17, 2020

(86) PCT No.: PCT/SE2020/050179
§ 371 (c)(1),
(2) Date: Aug. 16, 2021

(87) PCT Pub. No.: WO2020/171759
PCT Pub. Date: Aug. 27, 2020

(65) Prior Publication Data

US 2022/0145823 A1    May 12, 2022
US 2023/0212999 A9    Jul. 6, 2023

(30) Foreign Application Priority Data

Feb. 20, 2019 (SE) .................................. 1950212-9

(51) Int. Cl.
*F02D 41/40* (2006.01)
*F02D 41/00* (2006.01)
*F02D 13/02* (2006.01)

(52) U.S. Cl.
CPC ....... *F02D 41/402* (2013.01); *F02D 13/0249* (2013.01); *F02D 41/009* (2013.01)

(58) Field of Classification Search
CPC ...... F02D 13/02; F02D 13/0249; F02D 41/00; F02D 41/009; F02D 41/40; F02D 41/402; F01N 3/02; F01N 3/023
(Continued)

(56) References Cited

U.S. PATENT DOCUMENTS 6,082,100 A     7/2000  Boegner et al.
6,817,174 B1   11/2004  Igarashi et al.
(Continued)

FOREIGN PATENT DOCUMENTS

CN    1985081 A     6/2007
CN    101287896 A   10/2008
(Continued)

OTHER PUBLICATIONS

Scania CV AB, International Patent Application No. PCT/SE2020/050179, International Preliminary Report on Patentability, dated Aug. 10, 2021.
(Continued)

*Primary Examiner* — John Kwon
*Assistant Examiner* — Johnny H Hoang
(74) *Attorney, Agent, or Firm* — Moore & Van Allen PLLC; W. Kevin Ransom (57) ABSTRACT

Disclosed is a four-stroke direct injection engine comprising a camshaft, and exhaust valve, and a control system. The control system is configured to change the timing of the camshaft to advance a closing of the exhaust valve, control a first fuel injection step during a compression stroke of the piston, control a second fuel injection step during a power stroke of the piston, and control a third fuel injection step, after the second fuel injection step, during the power stroke of the piston.

8 Claims, 4 Drawing Sheets

(58) Field of Classification Search
USPC .................................................. 123/299–305
See application file for complete search history.

(56) References Cited

U.S. PATENT DOCUMENTS

| | | | |
|---|---|---|---|
| 7,059,281 B2 | 6/2006 | Kuo et al. | |
| 7,246,595 B1 | 7/2007 | Hoare et al. | |
| 7,464,689 B2 | 12/2008 | Siewert | |
| 8,676,475 B2 | 3/2014 | Cassani et al. | |
| 10,774,771 B2* | 9/2020 | Primus | F02D 41/405 |
| 2003/0221421 A1 | 12/2003 | Gui et al. | |
| 2004/0123588 A1 | 7/2004 | Stanglmaier et al. | |
| 2008/0022966 A1* | 1/2008 | Tamma | F02D 41/403 |
| | | | 123/480 |
| 2008/0028750 A1* | 2/2008 | Zukouski | F01N 3/0253 |
| | | | 60/285 |
| 2012/0037100 A1* | 2/2012 | McAlister | F02D 35/023 |
| | | | 123/41.02 |
| 2014/0019028 A1* | 1/2014 | Yacoub | F02D 41/025 |
| | | | 701/103 |
| 2014/0026873 A1 | 1/2014 | Gehrke et al. | |
| 2014/0325963 A1 | 11/2014 | Nagaoka et al. | |
| 2015/0167576 A1* | 6/2015 | Glugla | F02D 41/405 |
| | | | 123/295 |
| 2015/0275723 A1* | 10/2015 | Koch | F02M 26/43 |
| | | | 60/274 |
| 2016/0265469 A1* | 9/2016 | Harada | F02M 51/061 |
| 2017/0045000 A1 | 2/2017 | Mogavero et al. | |
| 2018/0347423 A1 | 12/2018 | Bleckmann et al. | |

FOREIGN PATENT DOCUMENTS

| | | |
|---|---|---|
| CN | 104508280 A | 4/2015 |
| DE | 102009019390 A1 | 11/2010 |
| DE | 102012018954 A1 | 3/2014 |
| DE | 102012018967 A1 | 3/2014 |
| DE | 102015015260 A1 | 6/2017 |
| EP | 1484494 A2 | 12/2004 |
| JP | 2017198129 A | 11/2017 |
| WO | 2018144378 A1 | 8/2018 |

OTHER PUBLICATIONS

Scania CV AB, International Patent Application No. PCT/SE2020/050179, International Search Report, dated Apr. 7, 2020.
Scania CV AB, International Patent Application No. PCT/SE2020/050179, Written Opinion, dated Apr. 7, 2020.
Scania CV AB, Swedish Patent Application No. 1950212-9, Office Action, dated Aug. 27, 2019.
Scania CV AB, Chinese Patent Application No. 202080008121.4, First Office Action, dated Jul. 13, 2022.
Scania CV AB, European Patent Application No. 20759844.2, Extended European Search Report, dated Oct. 19, 2022.
Scania CV AB, Chinese Patent Application No. 202080008121.4, Decision of Rejection, dated Apr. 24, 2023.
Scania CV AB, Chinese Patent Application No. 202080008121.4, Second Office Action, dated Jan. 20, 2023.

* cited by examiner

FOUR-STROKE INTERNAL COMBUSTION ENGINE AND METHOD OF OPERATING FOUR-STROKE INTERNAL COMBUSTION ENGINE

CROSS-REFERENCE TO RELATED APPLICATIONS

This application is a national stage application (filed under 35 § U.S.C. 371) of PCT/SE2020/050179, filed Feb. 17, 2020 of the same title, which, in turn, claims priority to Swedish Application No. 1950212-9 filed Feb. 20, 2019; the contents of each of which are hereby incorporated by reference.

TECHNICAL FIELD

The invention relates to a method of operating a four-stroke direct injection internal combustion engine, to a four-stroke direct injection internal combustion engine, and to a vehicle comprising a four-stroke direct injection internal combustion engine. The invention further relates to a computer program and to a computer-readable storage medium.

BACKGROUND

A modern four-stroke direct injection internal combustion engine, such as a diesel engine, is provided with an exhaust gas aftertreatment system in order to fulfil emission legislation, such as the European emission standard Euro 6. An exhaust gas aftertreatment system may comprise e.g. a diesel oxidation catalyst (DOC), a diesel particulate filter (DPF), and a selective catalytic reduction (SCR) device.

A sufficient exhaust gas temperature is required in order to ensure a proper function of the exhaust gas aftertreatment system. A particularly high exhaust gas temperature may be required for regenerating the DPF.

US 2003/0221421 discloses a control strategy for regenerating a particulate filter in an exhaust system of an engine having a variable valve actuation mechanism. A control for controlling a variable valve actuation mechanism of an internal combustion comprises an operating program for regenerating the particulate filter while the engine is running on its own power, by causing the variable valve actuation mechanism to change the timing of engine cylinder valves during an engine operating cycle, and as a result, elevate the temperature of the gas flow through the exhaust system to a temperature that is effective to combust particles trapped by the particulate filter.

US 2015/0275723 discloses a method for operating an internal combustion engine. A particulate filter is arranged in an exhaust system of the internal combustion engine, downstream of an oxidation catalyst. A closing moment of a discharge valve of a cylinder of the internal combustion engine is advanced when the temperature of the oxidation catalyst is in a first temperature range, thus, increasing the temperature of the exhaust gas. An injection valve is utilised to post-inject fuel into at least one cylinder of the internal combustion engine in order to help regenerate a particulate filter. The post-injections are performed when the temperature of the oxidation catalyst is in a second temperature range. An upper limit of the first temperature range having a lower value that an upper limit of the second temperature range.

SUMMARY

Not only temperature affects the regeneration of a particulate filter, but also NOx content of the gas flowing through the particulate filter.

It would be advantageous to achieve an alternative method of operating an internal combustion engine, ICE, which method will provide conditions for regenerating a particulate filter of an exhaust gas aftertreatment system connected to the ICE. In particular, it would be desirable to provide for an increased exhaust gas temperature as well as an increase in NOx content of the exhaust gas from an ICE. To better address this, a method of operating a four-stroke direct injection internal combustion engine having the features defined in one of the independent claims, and a four-stroke direct injection internal combustion engine defined in one of the independent claims are provided.

According to an aspect of the invention, there is provided a method of operating a four-stroke direct injection internal combustion engine, ICE, comprising at least one cylinder arrangement, a crankshaft, and a camshaft. The cylinder arrangement comprises a combustion chamber, a fuel injector, an exhaust valve, a cylinder bore, and a piston configured to reciprocate in the cylinder bore and being connected to the crankshaft. The camshaft is configured to control the opening and closing of the exhaust valve. A timing of the camshaft is controllable. The method comprises:
  a step of changing the timing of the camshaft to advance a closing of the exhaust valve,
  a first fuel injecting step during a compression stroke of the piston,
  a second fuel injecting step during a power stroke of the piston, and
  a third fuel injecting step, after the second fuel injecting step, during the power stroke of the piston.

Since the method comprises the step of changing the timing of the camshaft to advance the closing of the exhaust valve, the internal load on the ICE is increased and thus, a temperature of the exhaust gas is increased, and since the method comprises the first fuel injecting step during a compression stroke of the piston, increase of NOx content in the exhaust gas is promoted. Moreover, since the method comprises the third fuel injecting step, after the second fuel injecting step, fuel is injected into the combustion chamber, which fuel will not combust in the combustion chamber. Instead the fuel of the third injecting step is entrained with the exhaust gas for promoting exothermal reactions downstream of the exhaust valve and thus, for increasing the temperature of the exhaust gas.

In combination the steps of the method provide for high NOx content high temperature exhaust gas suitable e.g. for regenerating a particulate filter of an exhaust gas aftertreatment system connected to the ICE. The method provides high exhaust gas temperature at zero external load on the ICE. Advancing the closing of the exhaust valve in combination with the refined fuel injection strategy including the first, second, and third fuel injecting steps result in no need for external ICE load enhancing to increase exhaust gas temperature.

The four-stroke direct injection ICE may be a compression ignition ICE, such as a diesel engine. Herein, the four-stroke direct injection ICE simply may be referred to as an internal combustion engine, ICE.

The ICE may form part of a powertrain of a vehicle.

During normal operation of a four-stroke direct injection ICE, a common aim is to reduce the NOx content of the exhaust gas leaving the ICE. Thereby, the amount of NOx which has to be converted into harmless gases by the exhaust gas aftertreatment system connected to the ICE is reduced.

In contrast, the inventors have realised that under certain operating conditions of the ICE, an increased amount of NOx may be beneficial. For instance, if a particulate filter of the exhaust gas treatment system is to be regenerated, i.e. when soot is to be burned off from the particulate filter, NOx contributes to oxidation of the soot which mainly contains carbon, the regeneration resulting in inter alia $CO_2$ forming in the process.

Thus, the method may be implemented during regeneration of a particulate filter of an exhaust gas treatment system connected to the ICE. For instance, the method may be implemented when the ICE is not subjected to a high external load, e.g. when the ICE is subjected to low external load, or when a vehicle provided with the ICE is standing still.

Accordingly, the step of changing the timing of the camshaft to advance a closing of the exhaust valve provides an internal load on the ICE, which increases exhaust gas temperature compared to an ordinary timing of the camshaft. Put differently, the ICE itself produces an auxiliary load while the torque on the ICE output shaft is zero. Advancing the closing of the exhaust valve reduces the gas exchange in the cylinder bore and the combustion chamber, i.e. pumping work of the ICE is increased. The increased pumping work is overcome by adding fuel, which in turn increases exhaust gas temperature.

Alternative measures for regenerating the particulate filter are of course available, such as regeneration utilising high temperature exhaust gas produced during high external load operation of the ICE, e.g. when a vehicle provided with the ICE is travelling on an uphill gradient. Accordingly, the method may be implemented in situations where regeneration of the particulate filter is desired, or required, but when the ICE is not subjected to high external load.

As in any four-stroke ICE, the piston performs an intake stroke, a compression stroke, a power stroke, and an exhaust stroke in the cylinder bore of the cylinder arrangement. The rotation of the camshaft is synchronized with the crankshaft. The exhaust valve is configured to open and close an exhaust opening leading out of the combustion chamber, through which exhaust opening gas is admitted out of the combustion chamber. The piston is connected to the crankshaft via a connecting rod.

The cylinder arrangement comprises an intake valve which is configured to open and close an intake opening leading into the combustion chamber, through which intake opening gas is admitted into the combustion chamber. The ICE may comprise more than one cylinder arrangement, such as e.g. four, five, six, or eight cylinder arrangements.

Each of the first, second, and third fuel injecting steps involves fuel injection into the combustion chamber with the fuel injector. Each of the first, second, and third fuel injecting step comprises at least one individual fuel injecting operation. One or more of the first, second, and third fuel injecting steps may comprise two or more individual fuel injecting operations. Each individual fuel injecting operation is performed with the fuel injector.

The timing of the camshaft being controllable entails that the rotational position of the camshaft in relation to the crankshaft is changeable. This may also be referred to as cam phasing. In practice, this means that the crankshaft angle at which a valve controlled by the camshaft is opened and closed can be changed.

The step of changing the timing of the camshaft to advance a closing of the exhaust valve may be performed in any known manner. For instance, WO 2017/217908 and U.S. Pat. No. 8,714,123 disclose suitable timing control arrangements to be utilised for changing the timing of the camshaft. Other variable valve timing technology which changes the timing of the camshaft may alternatively be used.

The amount of timing change of the camshaft may be one fixed amount of timing change or a variable amount of timing change providing at least two different amounts of timing change to provide different levels of internal load on the ICE and thus, different levels of temperature increase of the exhaust gas.

Herein, reference will be made to crankshaft angle, CA, degrees when discussing timing of fuel injecting steps, and timing changes of the camshaft. One full rotation of the crankshaft is 360 CA degrees. Crankshaft angle is measured from Top Dead Centre fire, TDCf, the TDC between the compression stroke and of the power stroke, i.e. TDCf is 0 CA degrees. Negative values of CA are before TDCf, also referred to as BTDCf, positive values of CA are after TDCf, also referred to as ATDCf.

If the ICE comprises more than one exhaust valve, the step of changing the timing of the camshaft to advance the closing of the exhaust valve encompasses advancing the closing of all exhaust valves. Accordingly, if additional exhaust valves are controlled by additional camshafts, also the timing any additional camshafts have to be changed.

According to embodiments, the first fuel injecting step may comprise at least two individual fuel injecting operations. In this manner, the first individual fuel injecting operation will set off early combustion and NOx production and the second individual fuel injecting operation promotes further NOx production in the exhaust gas by supporting the combustion awaiting the second fuel injecting step taking place during the power stroke. In a similar manner, a third individual fuel injecting operation may support the combustion during the compression stroke awaiting the second fuel injecting step.

According to embodiments, the third fuel injecting step may take place after opening of the exhaust valve during the power stroke. In this manner, the fuel injected during the third fuel injecting step may be entrained with the exhaust gas escaping through the exhaust valve and further downstream to the aftertreatment system where exhaust temperature may be further increased by exothermal reactions.

According to embodiments, the second fuel injecting step may comprise at least two individual fuel injection operations. In this manner, the first individual fuel injecting operation may form the main source of combustion energy while the second individual fuel injecting operation may increase exhaust gas temperature.

According to embodiments, wherein the ICE comprises an exhaust gas aftertreatment system, which comprises a first selective catalytic reduction, SCR, device and downstream thereof a particulate filter, the method may comprise:
   a step of refraining from injecting urea or ammonia into the first selective catalytic reduction device. In this manner, the NOx content of the exhaust gas from the ICE is not reduced in the first selective catalytic reduction device, but will instead reach the particulate filter and thus, contribute to the regeneration of the particulate filter.

According to embodiments, the first fuel injecting step may be performed within a range of −40 to −15 CA degrees in relation to 0 CA degrees being at TDCf, i.e. 40–15 CA degrees BTDCf. In this manner, NOx content of the exhaust gas may be increased by combustion during the compression stroke. At least one individual fuel injecting operation of the first fuel injecting step may be performed within the above defined −40 to −15 CA degrees. However, all individual fuel injecting operations of the first fuel injecting step may be performed within the above defined −40 to −15 CA degrees.

According to embodiments, a second individual fuel injection operation subsequent to a first individual fuel injection operation of the second fuel injecting step may be performed within a range of 30-50 CA degrees in relation to 0 CA degrees being at TDCf, i.e. 30-50 CA degrees ATDCf. In this manner, the second individual fuel injection operation provides for an exhaust gas temperature increase.

According to a further aspect of the invention, there is provided a four-stroke direct injection internal combustion engine comprising at least one cylinder arrangement, a crankshaft, a camshaft, and a control system. The cylinder arrangement comprises a combustion chamber, a fuel injector, an exhaust valve, a cylinder bore, and a piston configured to reciprocate in the cylinder bore and being connected to the crankshaft. The fuel injector is controllable by the control system. The camshaft is configured to control the opening and closing of the exhaust valve. A timing of the camshaft is controllable by the control system. The control system is configured to:
- change the timing of the camshaft to advance a closing of the exhaust valve,
- control a first fuel injecting step during a compression stroke of the piston,
- control a second fuel injecting step during a power stroke of the piston, and
- control a third fuel injecting step, after the second fuel injecting step, during the power stroke of the piston.

Similarly, as mentioned above in connection with the method, since the control system is configured to change the timing of the camshaft to advance the closing of the exhaust valve, the internal load on the ICE is increased and thus, a temperature of the exhaust gas is increased, and since the control system is configured to control a first fuel injecting step during a compression stroke of the piston, increase of NOx content in the exhaust gas is promoted. Moreover, since the control system is configured to control the third fuel injecting step, after the second fuel injecting step, fuel is injected into the combustion chamber, which fuel will not combust in the combustion chamber. Instead the fuel of the third injecting step is entrained with the exhaust gas for promoting exothermal reactions downstream of the exhaust valve and thus, for increasing the temperature of the exhaust gas.

In combination, the control measures of the control system provide for high NOx content high temperature exhaust gas suitable e.g. for regenerating a particulate filter of an exhaust gas aftertreatment system connected to the ICE. High exhaust gas temperature is provided for at zero external load on the ICE. Advancing the closing of the exhaust valve in combination with the refined fuel injection strategy including the first, second, and third fuel injecting steps result in no need for external ICE load enhancing.

According to a further aspect of the invention, there is provided a vehicle comprising a four-stroke direct injection internal combustion engine according to any one of aspects and/or embodiments discussed herein.

The vehicle may be a heavy load vehicle such as e.g. a truck, a bus, a construction vehicle, a pickup, a van, a train engine, or other similar motorized manned or unmanned vehicle, designed for land-based propulsion, on or off road.

According to a further aspect of the invention, there is provided a computer program comprising instructions which, when the program is executed by a computer, cause the computer to carry out the method according to any one of aspects and/or embodiments discussed herein.

According to a further aspect of the invention, there is provided a computer-readable storage medium comprising instructions which, when executed by a computer, cause the computer to carry out the method according to any one of aspects and/or embodiments discussed herein.

Further features of, and advantages with, the invention will become apparent when studying the appended claims and the following detailed description.

BRIEF DESCRIPTION OF THE DRAWINGS

Various aspects and/or embodiments of the invention, including its particular features and advantages, will be readily understood from the example embodiments discussed in the following detailed description and the accompanying drawings, in which.

DETAILED DESCRIPTION

Aspects and/or embodiments of the invention will now be described more fully. Like numbers refer to like elements throughout. Well-known functions or constructions will not necessarily be described in detail for brevity and/or clarity.

Figure 1:
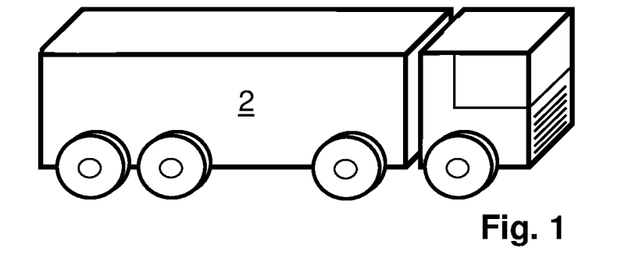
FIG. 1 schematically illustrates a vehicle according to embodiments.

FIG. 1 schematically illustrates a vehicle 2 according to embodiments. The vehicle 2 may be a heavy goods vehicle, designed for land-based propulsion. The vehicle 2 comprises a four-stroke direct injection internal combustion engine, ICE, according to any one of aspects and/or embodiments discussed herein, such as e.g. the ICE discussed below with reference to FIG. 2. The ICE forms part of a powertrain of the vehicle 2.

Figure 2:
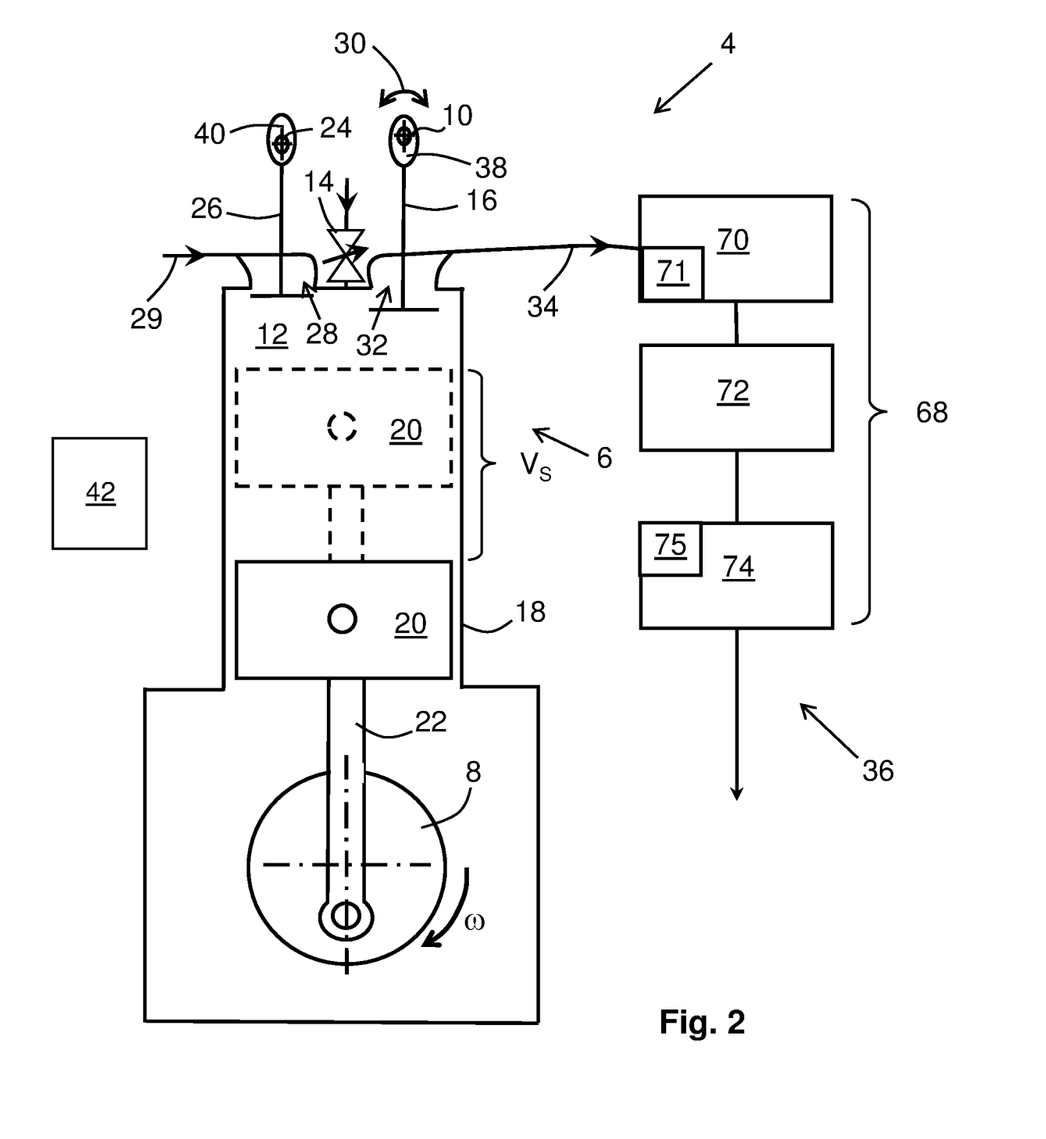
FIG. 2 schematically illustrates embodiments of an internal combustion engine.

FIG. 2 schematically illustrates embodiments of an ICE 4. The ICE 4 may be configured to form part of a powertrain of a vehicle, such as e.g. the vehicle 2 shown in FIG. 1.

The ICE 4 is a four-stroke direct injection internal combustion engine, such as a compression ignition ICE 4, e.g. a diesel engine. The ICE 4 comprises at least one cylinder arrangement 6, a crankshaft 8, a camshaft 10.

The cylinder arrangement 6 comprises a combustion chamber 12, a fuel injector 14, an exhaust valve 16, a cylinder bore 18, and a piston 20 configured to reciprocate in the cylinder bore 18. The piston 20 is connected to the crankshaft 8 via a connecting rod 22. The movement of the exhaust valve 16 is controlled by the camshaft 10, i.e. the camshaft 10 is configured to control the opening and closing of the exhaust valve 16.

The ICE 4 comprises a further camshaft 24 and the cylinder arrangement 6 comprises an intake valve 26. The movement of the intake valve 26 is controlled by the further camshaft 24.

The intake valve 26 is configured for admitting gas into the combustion chamber 12, and the exhaust valve 16 is configured for admitting gas out of the combustion chamber 12. At least the timing of the camshaft 10 is configured to the be controlled by a timing control arrangement 30 as indicated by a double arrow.

In a known manner, the piston 20 is arranged to reciprocate in the cylinder bore 18. The piston 20 performs four strokes in the cylinder bore 18, corresponding to an intake stroke, a compression stroke, a power stroke, and an exhaust stroke, see also FIG. 4. In FIG. 2 the piston 20 is illustrated with continuous lines at its Bottom Dead Centre, BDC, and with dashed lines at its Top Dead Centre, TDC. The combustion chamber 12 is formed above the piston 20 inside the cylinder bore 18.

In a known manner, the intake valve 26 comprises an intake valve head configured to seal against an intake valve seat extending around an intake opening 28. An inlet conduit 29 for fresh gas, such as air, leads to the intake opening 28. The exhaust valve 16 comprises an exhaust valve head configured to seal against an exhaust valve seat extending around an exhaust opening 32. An exhaust conduit 34 leads from the exhaust opening 32 towards an exhaust system 36 connected to the ICE 4.

In a known manner, the camshafts 10, 24 rotate at half the rotational speed of the crankshaft 8 and control the movement of the intake and exhaust valves 16, 26 via lobes 38, 40 arranged on the camshafts 10, 24. The camshaft 10 is arranged for controlling movement of the exhaust valve 16, and opening and closing of the exhaust opening 32. The camshaft 10 comprises a lobe 38 configured to abut against the exhaust valve 16. Thus, the exhaust valve 16 will follow a contour of the lobe 38. The exhaust valve 16 may be biased towards its closed position, e.g. by means of a non-shown spring. The movement of the intake valve 26 is controlled in the same manner by the further camshaft 24 and its lobe 40.

The cylinder arrangement 6 has a total swept volume, $V_s$, in the cylinder bore 18 between the BDC and the TDC. According to some embodiments, the cylinder arrangement 6 may have a total swept volume, $V_s$, of within a range of 0.3 to 4 litres. Mentioned purely as an example, in the lower range of Vs, the cylinder arrangement 6 may form part of an internal combustion engine for a passenger car, and in the middle and higher range of Vs, the cylinder arrangement 4 may form part of an internal combustion engine for a heavy load vehicle such as e.g. a truck, a bus, or a construction vehicle.

The ICE 4 comprises a control system 42. The control system 42 is configured to control at least fuel injection into the combustion chamber 12 and the timing of the camshaft 10. Thus, the fuel injector 14 and the timing control arrangement 30 are controllable by the control system 42.

Figure 3:
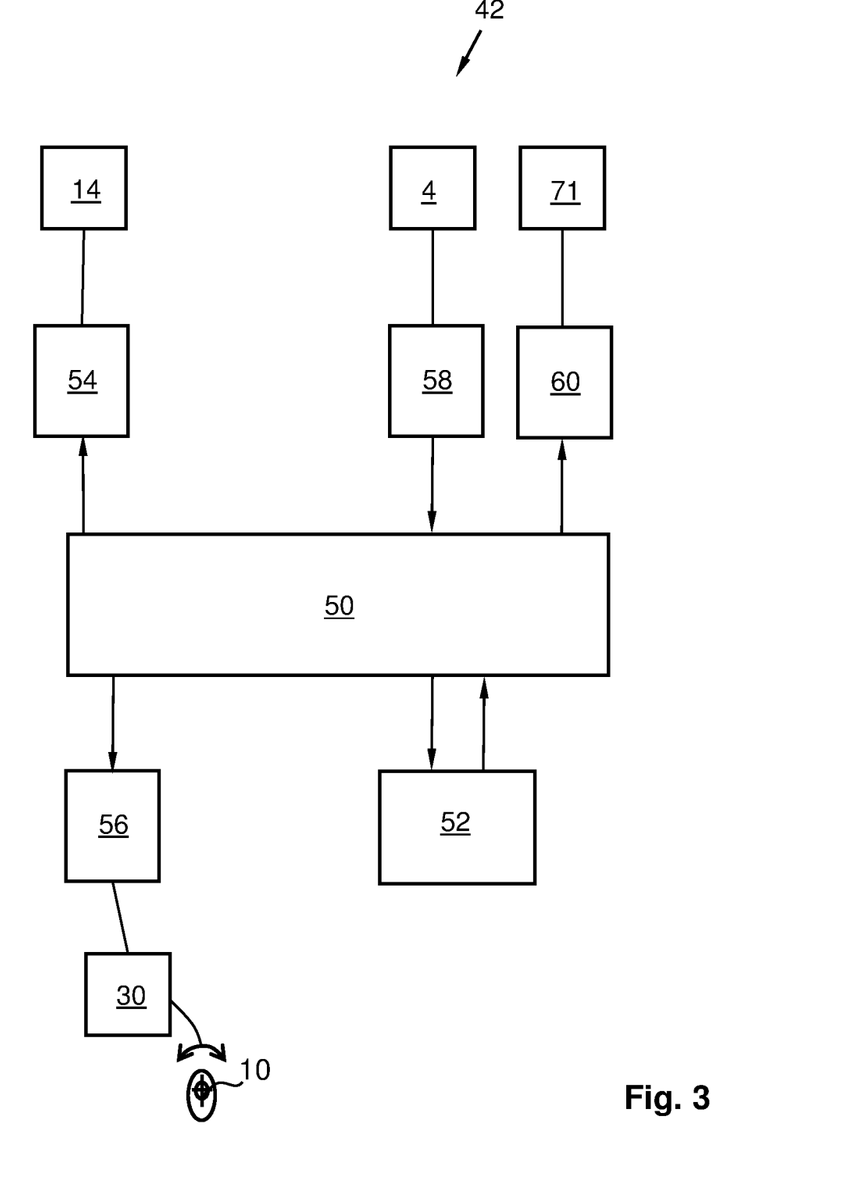
FIG. 3 illustrates a control system.

FIG. 3 illustrates a control system 42 to be utilised in connection with the different aspects and/or embodiments of the invention. The control system 42 is also indicated in FIG. 2. The control system 42 comprises at least one calculation unit 50, which may take the form of substantially any suitable type of processor circuit or microcomputer, e.g. a circuit for digital signal processing (digital signal processor, DSP), a Central Processing Unit (CPU), a processing unit, a processing circuit, a processor, an Application Specific Integrated Circuit (ASIC), a microprocessor, or other processing logic that may interpret and execute instructions. The herein utilised expression "calculation unit" may represent a processing circuitry comprising a plurality of processing circuits, such as, e.g., any, some or all of the ones mentioned above. The control system 42 comprises a memory unit 52. The calculation unit 50 is connected to the memory unit 52, which provides the calculation unit 50 with, e.g. stored programme code, data tables, and/or other stored data which the calculation unit 50 needs to enable it to do calculations and to control the ICE and optionally an exhaust gas aftertreatment system connected to the ICE. The calculation unit 50 is also adapted to store partial or final results of calculations in the memory unit 52. The memory unit 52 may comprise a physical device utilised to store data or programs, i.e. sequences of instructions on a temporary or permanent basis. According to some embodiments, the memory unit 52 may comprise integrated circuits comprising silicon-based transistors. The memory unit 52 may comprise e.g. a memory card, a flash memory, a USB memory, a hard disc, or another similar volatile or non-volatile storage unit for storing data such as e.g. ROM (Read-Only Memory), PROM (Programmable Read-Only Memory), EPROM (Erasable PROM), EEPROM (Electrically Erasable PROM), etc. in different embodiments.

The control system 42 is further provided with respective devices 54, 56, 58, 60 for receiving and/or sending input and output signals. These input and output signals may comprise waveforms, pulses or other attributes, which can be detect as information by signal receiving devices, and which can be converted to signals processable by the calculation unit 50. Input signals are supplied to the calculation unit 50. Output signal sending devices 54, 56, 60 are arranged to convert calculation results from the calculation unit 50 to output signals for conveying signal receiving devices of other parts of the control system 42. Each of the connections to the respective devices for receiving and sending input and output signals may take the form of one or more from among a cable, a data bus, e.g. a CAN (controller area network) bus, a MOST (media orientated systems transport) bus or some other bus configuration, or a wireless connection. In the embodiment depicted, only one calculation unit 50 and memory 52 are shown, but the control system 42 may alternatively comprise more than one calculation unit and/or memory.

Mentioned as examples, the output signal sending devices 54, 56 may send control signals to the fuel injector 14 and to a timing control arrangement 30 of the camshaft 10. The input signal receiving device 58 may receive signals from the ICE, such as from a rotational speed sensor sending signals related to the rotational speed of the crankshaft of the ICE to the calculation unit 50.

An example of a data table may be a table containing fuel injection quantities. Examples of data may be measured, monitored, and/or calculated data. The control system 42 is connected to various sensors and actuators in order to receive input and provide output for performing the various aspects and embodiments of the method discussed herein. An example of a sensor may be a rotational speed sensor. An example of an actuator may a fuel injector.

In the following reference is made to FIGS. 2 and 3. For instance, when a particulate filter of an exhaust gas aftertreatment system connected to the ICE 4 is to be regenerated, the control system 42 is configured to:

Change the timing of the camshaft 10 to advance a closing of the exhaust valve 16. Thus, an internal load on the ICE 4 is produced, which causes an increase exhaust gas temperature.

Control a first fuel injecting step during a compression stroke of the piston 20. Thus, NOx content of exhaust gas is increased by early fuel injection into the combustion chamber 12.

Control a second fuel injecting step during a power stroke of the piston 20. The second fuel injecting step comprise the main individual fuel injecting operation, or operations, shortly after the piston 20 has passed TDCf.

However, later during the second fuel injecting step, before the exhaust valve 16 opens, a further individual fuel injecting operation may increase exhaust gas temperature.

Control a third fuel injecting step, after the second fuel injecting step, during the power stroke of the piston 20. Fuel injected into the combustion chamber during the third fuel injecting step will not combust in the combustion chamber. This fuel is entrained with the exhaust gas to flow downstream of the exhaust valve 16, and the exhaust opening 32. See also below with reference to FIGS. 4 and 5 and the method 100 discussed with reference to FIG. 6.

According to embodiments, the third fuel injecting step may take place after opening of the exhaust valve 16 during the power stroke. In this manner, fuel injected during the third fuel injecting step may be entrained with the exhaust gas out of the combustion chamber 12. Thus, the fuel injected during the third fuel injecting step may flow downstream of the exhaust valve 16 and the exhaust opening 32 to increase exhaust gas temperature in the exhaust system of 36 connected to the ICE 4.

The exhaust gas increasing measures of changing the timing of the camshaft 10 to advance the closing of the exhaust valve 16, and/or the first fuel injecting step during the compression stroke of the piston 20, and/or the second fuel injecting step during the power stroke of the piston 20 promote exothermal reactions downstream of the exhaust valve 16 energised by the fuel injected in the third fuel injecting step.

According to embodiments, the third fuel injecting step may take place within a range of 0-25 CA degrees after opening the exhaust valve 16 during the power stroke.

According to embodiments, the change of the timing of the camshaft 10 to advance the closing of the exhaust valve may comprise advancing the closing of the exhaust valve 16 at least 60 CA degrees from an ordinary exhaust valve closing. In this manner, an internal load is put on the ICE 4, which increases exhaust gas temperature.

The ordinary closing of the exhaust valve 16 is that, at which the exhaust valve 16 closes during normal operation of the ICE 4, i.e. when the ICE 4 produces positive torque on its output shaft to drive e.g. a vehicle.

According to some embodiments, the change of the timing of the camshaft 10 to advance the closing of the exhaust valve may comprise advancing the closing of the exhaust valve 16 within a range of 1-100 CA degrees from an ordinary exhaust valve closing, preferably within a range of 60-80 CA degrees from an ordinary exhaust valve closing.

Figure 4:
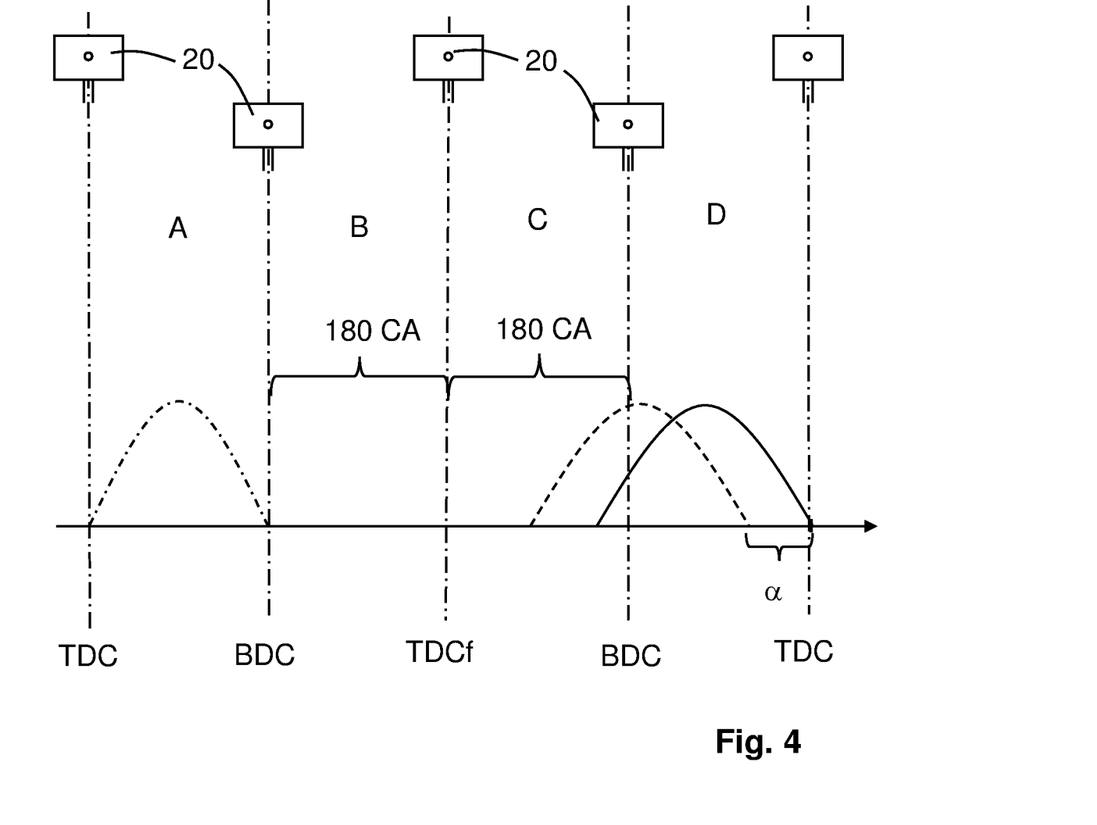
FIG. 4 illustrates a diagram over functionality of an internal combustion engine.

FIG. 4 illustrates a diagram over functionality the ICE 4 of FIG. 2. FIG. 4 illustrates the four strokes of the piston 20 and the movement of the exhaust valve and of the intake valve. The movement of the intake valve is indicated with a dash-dotted line. The movement of the exhaust valve during ordinary operation of the ICE is indicated with a full line.

The crankshaft of the ICE rotates 720 CA degrees as the four strokes of the piston 20 are performed. For each stroke, the crankshaft rotates 180 CA degrees as indicated in FIG. 4. A represents the intake stroke, B represents the compression stroke, C represents the power stroke, and D represents the exhaust stroke.

The broken line indicates the movement of the exhaust valve after the timing of the camshaft has been changed to advance the closing of the exhaust valve, in accordance with the present invention. In FIG. 4 α indicates advancing the closing of the exhaust valve, in accordance with the change of the timing of the camshaft discussed above with reference to FIGS. 2 and 3.

In FIG. 4 the advancing a indicated is approximately 60 CA degrees. That is, the exhaust valve will be closed during a large part of the last half of the exhaust stroke.

Mentioned as an example, the ordinary closing of the exhaust valve 16 during normal operation of the ICE 4 may be within a range of 350-390 CA degrees. In this example, the change of the timing of the camshaft 10 to advance the closing of the exhaust valve 16 at least 60 CA degrees from the ordinary exhaust valve closing means that the closing of the exhaust valve is advanced to 290-330 CA degrees.

Figure 5:
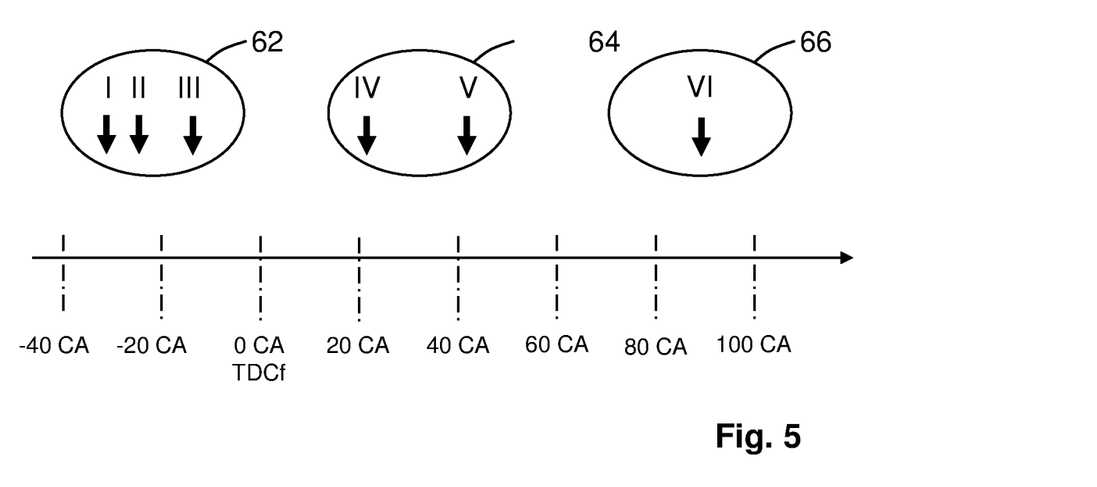
FIG. 5 illustrates different fuel injecting steps into a combustion chamber of an internal combustion engine.

FIG. 5 illustrates different fuel injecting steps into the combustion chamber of the ICE of FIG. 2, as discussed above with reference to FIGS. 2 and 3. The different fuel injecting steps are indicated with ovals in FIG. 5. The first fuel injecting step is indicated at 62. The second fuel injecting step is indicated at 64. The third fuel injecting step is indicated at 66. In FIG. 5, arrows indicated with roman numbers represent individual fuel injecting operations of the first, second, and third fuel injecting steps 62, 64, 66.

In the following reference is made to FIGS. 2-5 and the discussions above.

According to embodiments, the first fuel injecting step 62 may comprise at least two individual fuel injecting operations I, II, Ill. In this manner, early combustion for increased NOx production is initiated as well as maintained.

In the embodiments of FIG. 5, three individual fuel injecting operations I, II, III during the first fuel injecting step 62 are provided. The first and second individual fuel injecting operations I, II promote the production of NOx in the exhaust gas, whereas the third individual fuel injecting operation III is provided for maintaining the combustion in the combustion chamber 12 until the second fuel injecting step 64 during the power stroke of the piston 20.

According to embodiments, a first individual fuel injection operation I of the first fuel injecting step 62 may be performed within a range of −40 to −15 CA degrees in relation to 0 CA degrees at TDCf, i.e. 40-15 CA degrees BTDCf. In this manner, production of NOx in the exhaust gas may be promoted.

According to embodiments, the second fuel injecting step 64 may comprise at least two individual fuel injection operations IV, V. In this manner, a first individual fuel injecting operation IV of the second fuel injecting step 64 may form of the main individual fuel injecting operation for combustion with the aim of producing the main power during the power stroke, where as a second individual fuel injecting operation V of the second fuel injecting step 64 may be provided for increasing exhaust gas temperature. In FIG. 5, the first individual fuel injecting operation IV is performed shortly after the piston 20 has passed TDCf, within a range of 10-30 CA degrees ATDCf, such as at approximately 20 CA degrees ATDCf. The second individual fuel injecting operation V is performed later during the power stroke, before the exhaust valve 16 has started to open with the timing of the camshaft 10 changed for the advanced closing, and thus also advanced opening, of the exhaust valve 16. In FIG. 5, the second individual fuel injecting operation V is performed within a range of 30-50 CA degrees ATDCf, such as at approximately 40 CA degrees ATDCf.

In the following reference is made to FIG. 2. The exhaust system 36 comprises an exhaust gas aftertreatment system 68, i.e. an exhaust gas aftertreatment system 68 is connected to the exhaust conduit 34 of the ICE 4.

Accordingly, according to some embodiments, the internal combustion engine 4 may comprise an exhaust gas aftertreatment system 68, which may comprise a first selective catalytic reduction, SCR, device 70 and downstream thereof a particulate filter 72. The control system 42 may be configured to refrain from injecting urea or ammonia into the first SCR device 70. In this manner, NOx content of the exhaust gas from the ICE 4 may be maintained and may be utilised in the particulate filter 72 for regeneration thereof.

More specifically, the first SCR device 70, in a known manner, may be configured to reduce NOx content of exhaust gas utilising urea or ammonia. Thus, the first SCR device 70 comprises a first dosage device 71 configured to inject an additive comprising a urea or ammonia into the exhaust gas stream flowing into, and through, the first SCR device 70. The particulate filter 72 may be a diesel particulate filter, DPF, configured for reducing particles in the exhaust gas stream. In accordance with these embodiments, when the particulate filter 72 is regenerated, the NOx content of the exhaust gas is not reduced in the first SCR device 70 by the control system 42 controlling the first dosage device 71 to refrain from injecting urea or ammonia into the first SCR device 70. See also FIG. 3. Thus, the NOx in the exhaust gas may contribute to the regeneration of the particulate filter 72.

The exhaust gas aftertreatment system 68 may further comprise a second SCR device 74.

Such an exhaust gas aftertreatment system 68, its operation, and specific advantages, is discussed in detail in WO 2015/130211. During regeneration of the particulate filter 72, any remaining NOx content of the exhaust gas passing the particulate filter 72 may be reduced in the second SCR device 74. That is, a second dosage device 75 is controlled by the control system 42 to inject urea or ammonia into the second SCR device 74.

Figure 6:
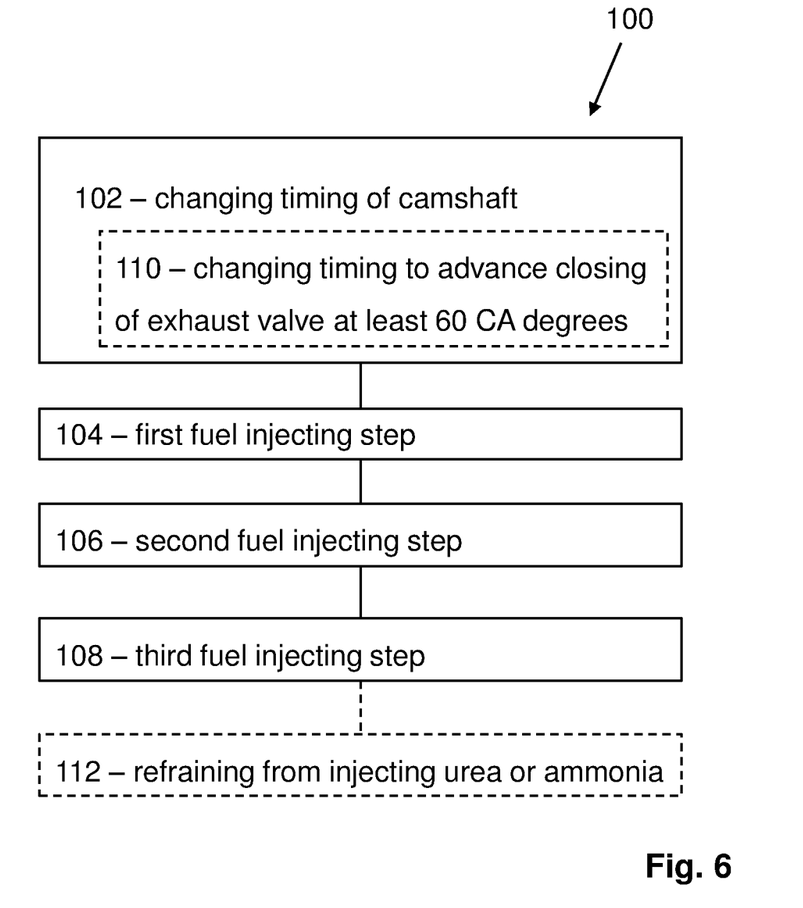
FIG. 6 illustrates embodiments of a method of operating a four-stroke internal combustion engine.

FIG. 6 illustrates embodiments of a method 100 of operating a four-stroke ICE. The vehicle and the ICE may be a vehicle 2 and an ICE 4 as discussed above in connection with FIGS. 1-5. Accordingly, in the following reference is also made to FIGS. 1-5 and the descriptions related thereto.

The method 100 comprises:
- a step 102 of changing the timing of the camshaft 10 to advance a closing of the exhaust valve 16,
- a first fuel injecting step 104 during a compression stroke of the piston 20,
- a second fuel injecting step 106 during a power stroke of the piston 20, and
- a third fuel injecting step 108, after the second fuel injecting step 106, during the power stroke of the piston 20.

As discussed inter alia above with reference to FIGS. 2-5, and the control system 42, the step 102 of changing the timing of the camshaft to advance the closing of the exhaust valve, increases the internal load on the ICE increases the exhaust gas temperature, the first fuel injecting step 104 during the compression stroke of the piston 20 promotes increased NOx content in the exhaust gas, the second fuel injecting step 106 provides a main individual fuel injecting operation and optionally an exhaust gas temperature increasing further individual fuel injecting operation, and the third fuel injecting step 108 provides fuel which will not combust in the combustion chamber but is entrained with the exhaust gas from the combustion chamber 12.

Particularly, reference is made to the first, second, and third fuel injecting steps 62, 64, 66 discussed above with reference to FIG. 5, which correspond to the respective first, second, and third fuel injecting steps 104, 106, 108 of the method 100.

According to embodiments, the first fuel injecting step 104 may comprise at least two individual fuel injecting operations. As discussed above, the first individual fuel injecting operation will set off early combustion and NOx production and the second individual fuel injecting operation promotes further NOx production in the exhaust gas by supporting the combustion awaiting the second fuel injecting step taking place during the power stroke. In a similar manner, a third individual fuel injecting operation may support the combustion during the compression stroke awaiting the second fuel injecting step, see also above with reference to FIG. 5.

According to embodiments, the third fuel injecting step 108 may take place after opening of the exhaust valve 16 during the power stroke of the piston 20. As discussed above, the fuel injected during the third fuel injecting step 108 may be entrained with the exhaust gas escaping through the exhaust valve to promote exhaust gas temperature increase downstream of the exhaust valve.

According to embodiments, the second fuel injecting step 106 may comprise at least two individual fuel injection operations. As discussed above, the first individual fuel injecting operation of the second fuel injecting step 106 may form the main source of combustion energy while the second individual fuel injecting operation may increase exhaust gas temperature.

According to embodiments, the step 102 of changing the timing of the camshaft may comprise:
- a step 110 of changing the timing to advance the closing of the exhaust valve at least 60 crankshaft angle, CA, degrees from an ordinary exhaust valve closing. In this manner, the ICE 4 may be subjected to a substantial internal load, which will increase exhaust gas temperature.

According to embodiments, wherein the ICE comprises an exhaust gas aftertreatment system, which comprises a first selective catalytic reduction, SCR, device 70 and downstream thereof a particulate filter 72, the method 100 may comprise:
- a step 112 of refraining from injecting urea or ammonia into the first selective catalytic reduction device. As mentioned above, the NOx content of the exhaust gas from the ICE 4 is thus, not reduced in the first selective catalytic reduction device 70, but will instead reach the particulate filter 72 and thus, contribute to the regeneration of the particulate filter 72.

According to embodiments, the first fuel injecting step 104 may be performed within a range of −40 to −15 CA degrees in relation to 0 CA degrees being at TDCf. As discussed above, NOx content of the exhaust gas may be increased by combustion during the compression stroke. By performing one or more individual fuel injecting operations within the above defined −40 to −15 degrees CA this may be achieved.

According to embodiments, a second individual fuel injection operation subsequent to a first individual fuel injection operation of the second fuel injecting step 106 may be performed within a range of 30-50 degrees crankshaft angle, CA, in relation to 0 crankshaft angle, CA, degrees being at TDCf. As discussed above, this provides for an exhaust gas temperature increase.

The method 100 may be implemented in situations where regeneration of the particulate filter is desired, or required, but when the ICE 4 is not subjected to high external load. In such situations a vehicle comprising the ICE 4 may be standing still. This may for instance occur during service of the ICE 4 and the vehicle 2.

A further alternative may be to perform the method 100 when the ICE 4 is subjected to low load, which in itself does not produce a high enough exhaust gas temperature for regenerating a particulate filter.

Mentioned as an example, e.g. in such above discussed situations, the method 100 may be performed continuously over a time period having a length within a range of 20-120 minutes. In this manner, the particulate filter 72 may be regenerated.

According to an aspect there is provided a computer program comprising instructions which, when the program is executed by a computer, cause the computer to carry out the method 100 according to any one of aspect and/or embodiments discussed herein, in particular with reference to FIG. 6. One skilled in the art will appreciate that the method 100 of operating a four-stroke ICE may be implemented by programmed instructions. These programmed instructions are typically constituted by a computer program, which, when it is executed in a computer or control system, ensures that the computer or control system carries out the desired control, such as the method steps 102-112 according to the invention. The computer program is usually part of a computer programme product which comprises a suitable digital storage medium on which the computer program is stored.

Figure 7:
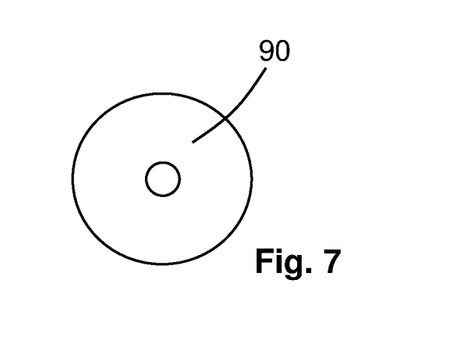
FIG. 7 shows a computer-readable storage medium according to embodiments.

FIG. 7 shows a computer-readable storage medium 90 according to embodiments. The computer-readable storage medium 90 comprises instructions which, when executed by a computer or other control system 42, causes the computer or other control system 42 to carry out the method 100 according to any one of aspects and/or embodiments discussed herein. The computer-readable storage medium 90 may be provided for instance in the form of a data carrier carrying computer program code for performing at least some of the steps 102-112 according to some embodiments when being loaded into the one or more calculation units 50 of the control system 42. The data carrier may be, e.g. a ROM (read-only memory), a PROM (programmable read-only memory), an EPROM (erasable PROM), a flash memory, an EEPROM (electrically erasable PROM), a hard disc, a CD ROM disc, a memory stick, an optical storage device, a magnetic storage device or any other appropriate medium such as a disk or tape that may hold machine readable data in a non-transitory manner. The computer-readable storage medium may furthermore be provided as computer program code on a server and may be downloaded to the control system 42 remotely, e.g., over an Internet or an intranet connection, or via other wired or wireless communication systems.

It is to be understood that the foregoing is illustrative of various example embodiments and that the invention is defined only by the appended claims. A person skilled in the art will realize that the example embodiments may be modified, and that different features of the example embodiments may be combined to create embodiments other than those described herein, without departing from the scope of the invention, as defined by the appended claims.

The invention claimed is:

1. A method of controlling operation of a four-stroke direct injection internal combustion engine during regeneration of a particulate filter of an exhaust gas treatment system connected to the internal combustion engine, wherein said internal combustion engine comprises at least one cylinder arrangement, a crankshaft, and a camshaft, the cylinder arrangement comprising a combustion chamber, a fuel injector, an exhaust valve, a cylinder bore, and a piston configured to reciprocate in the cylinder bore and being connected to the crankshaft, wherein the camshaft is configured to control the opening and closing of the exhaust valve, wherein a timing of the camshaft is controllable, and wherein the method comprises the steps of:
    a) adjusting the timing of the camshaft to advance a closing of the exhaust valve at least sixty (60) crankshaft angle degrees;
    b) controlling the fuel injector to inject fuel into the cylinder bore during a compression stroke of the piston within a range of −40 to −15 crankshaft angle degrees in relation to zero (0) crankshaft angle degrees being at top dead center fire; and
    c) controlling the fuel injector to inject fuel into the cylinder bore three separate instances during a power stroke of the piston as follows:
        controlling the fuel injector to inject fuel into the cylinder bore at a first instance after the power stroke of the piston has been initiated;
        controlling the fuel injector to inject fuel into the cylinder bore at a second instance after the first instance and within a range of 30 to 50 degrees crankshaft angle in relation to zero (0) crankshaft angle degrees being at top dead center fire; and
        controlling the fuel injector to inject fuel into the cylinder bore at a third instance after the second instance and after an opening of the exhaust valve during the power stroke,
    wherein the combination of controlling the fuel injector to inject fuel at steps b) thru c), while controlling the timing of the camshaft to advance closing of the exhaust valve in step a) thereby causes at least one of an increase in: (i) a temperature of an exhaust gas exiting the internal combustion engine, or (ii) a content of nitrogen oxide in the exhaust gas.

2. The method according to claim 1, wherein step b) comprises controlling the fuel injector to perform at least one additional fuel infection during the compression stroke of the piston.

3. The method according to claim 1, wherein the internal combustion engine comprises an exhaust gas aftertreatment system, which comprises a first selective catalytic reduction device and downstream thereof a particulate filter, and wherein the method further comprises:
    refraining from injection of urea or ammonia into the first selective catalytic reduction device.

4. A four-stroke direct injection internal combustion engine comprising at least one cylinder arrangement, a crankshaft, a camshaft, and a control system, wherein the cylinder arrangement comprises a combustion chamber, a fuel injector, an exhaust valve, a cylinder bore, and a piston configured to reciprocate in the cylinder bore and being connected to the crankshaft, wherein the fuel injector is controllable by the control system, wherein the camshaft is configured to control the opening and closing of the exhaust valve, wherein a timing of the camshaft is controllable by the control system, and wherein the control system is configured to perform the following steps during regeneration of a particulate filter of an exhaust gas treatment system connected to the internal combustion engine:
    a) adjust the timing of the camshaft to advance a closing of the exhaust valve at least sixty (60) crankshaft angle degrees;
    b) control the fuel injector to inject fuel into the cylinder bore during a compression stroke of the piston within a range of −40 to −15 crankshaft angle degrees in relation to zero (0) crankshaft angle degrees being at top dead center fire; and c) control the fuel injector to inject fuel into the cylinder bore three separate instances during a power stroke of the piston as follows:

control the fuel injector to inject fuel into the cylinder bore at a first instance after the power stroke of the piston has been initiated;

control the fuel injector to inject fuel into the cylinder bore at a second instance after the first instance and within a range of 30 to 50 degrees crankshaft angle in relation to zero (0) crankshaft angle degrees being at top dead center fire; and control the fuel injector to inject fuel into the cylinder bore at a third instance after the second instance and after an opening of the exhaust valve during the power stroke, wherein the combination of controlling the fuel injector to inject fuel at steps b) thru c), while controlling the timing of the camshaft to advance closing of the exhaust valve in step a) thereby causes at least one of an increase in: (i) a temperature of an exhaust gas exiting the internal combustion engine, or (ii) a content of nitrogen oxide in the exhaust gas.

5. The internal combustion engine according to claim 4, wherein step b) controlling the fuel injector to perform at least one additional fuel injection during the compression stroke of the piston.

6. The internal combustion engine according to claim 4, comprising an exhaust gas aftertreatment system, which comprises a first selective catalytic reduction device and downstream thereof a particulate filter, and wherein the control system is further configured to refrain from injection of ammonia into the first selective catalytic reduction device.

7. A vehicle comprising a four-stroke direct injection internal combustion engine comprising at least one cylinder arrangement, a crankshaft, a camshaft, and a control system, wherein the cylinder arrangement comprises a combustion chamber, a fuel injector, an exhaust valve, a cylinder bore, and a piston configured to reciprocate in the cylinder bore and being connected to the crankshaft, wherein the fuel injector is controllable by the control system, wherein the camshaft is configured to control the opening and closing of the exhaust valve, wherein a timing of the camshaft is controllable by the control system, and wherein the control system is configured to perform the following steps during regeneration of a particulate filter of an exhaust gas treatment system connected to the internal combustion engine:

a) adjust the timing of the camshaft to advance a closing of the exhaust valve at least sixty (60) crankshaft angle degrees;

b) control the fuel injector to inject fuel into the cylinder bore during a compression stroke of the piston within a range of −40 to −15 crankshaft angle degrees in relation to zero (0) crankshaft angle degrees being at top dead center fire; and c) control the fuel injector to inject fuel into the cylinder bore three separate instances during a power stroke of the piston as follows:

control the fuel injector to inject fuel into the cylinder bore at a first instance after the power stroke of the piston has been initiated;

control the fuel injector to inject fuel into the cylinder bore at a second instance after the first instance and within a range of 30 to 50 degrees crankshaft angle in relation to zero (0) crankshaft angle degrees being at top dead center fire; and control the fuel injector to inject fuel into the cylinder bore at a third instance after the second instance and after an opening of the exhaust valve during the power stroke, wherein the combination of controlling the fuel injector to inject fuel at steps b) thru c), while controlling the timing of the camshaft to advance closing of the exhaust valve in step a) thereby causes at least one of an increase in: (i) a temperature of an exhaust gas exiting the internal combustion engine, or (ii) a content of nitrogen oxide in the exhaust gas.

8. A computer program product comprising computer program code stored on a non-transitory computer-readable medium, said computer program product used for controlling operation of a four stroke direct injection internal combustion engine during regeneration of a particulate filter of an exhaust gas treatment system connected to the internal combustion engine, wherein said internal combustion engine comprises at least one cylinder arrangement, a crankshaft, and a camshaft, the cylinder arrangement comprising a combustion chamber, a fuel injector, an exhaust valve, a cylinder bore, and a piston configured to reciprocate in the cylinder bore and being connected to the crankshaft, wherein the camshaft is configured to control the opening and closing of the exhaust valve, wherein a timing of the camshaft is controllable, said computer program code comprising computer instructions to cause one or more control devices to perform the following steps:

a) adjusting the timing of the camshaft to advance a closing of the exhaust valve at least sixty (60) crankshaft angle degrees;

b) controlling the fuel injector to inject fuel into the cylinder bore during a compression stroke of the piston within a range of −40 to −15 crankshaft angle degrees in relation to zero (0) crankshaft angle degrees being at top dead center fire; and c) controlling the fuel injector to inject fuel into the cylinder bore three separate instances during a power stroke of the piston as follows:

controlling the fuel injector to inject fuel into the cylinder bore at a first instance after the power stroke of the piston has been initiated;

controlling the fuel injector to inject fuel into the cylinder bore at a second instance after the first instance and within a range of 30 to 50 degrees crankshaft angle in relation to zero (0) crankshaft angle degrees being at top dead center fire; and controlling the fuel injector to inject fuel into the cylinder bore at a third instance after the second instance and after an opening of the exhaust valve during the power stroke, wherein the combination of controlling the fuel injector to inject fuel at steps b) thru c), while controlling the timing of the camshaft to advance closing of the exhaust valve in step a) thereby causes at least one of an increase in: (i) a temperature of an exhaust gas exiting the internal combustion engine, or (ii) a content of nitrogen oxide in the exhaust gas.

\* \* \* \* \*

UNITED STATES PATENT AND TRADEMARK OFFICE
CERTIFICATE OF CORRECTION

PATENT NO. : 11,835,010 B2
APPLICATION NO. : 17/431186
DATED : December 5, 2023
INVENTOR(S) : Andreas Dahl and Michael Vallinder It is certified that error appears in the above-identified patent and that said Letters Patent is hereby corrected as shown below:

In the Claims

In Column 14, Claim 2, Line 40, "infection" should be replaced with --injection--

Signed and Sealed this
Thirteenth Day of February, 2024

Katherine Kelly Vidal
*Director of the United States Patent and Trademark Office*